United States Patent [19]

Lee

[11] Patent Number: 5,262,997

[45] Date of Patent: Nov. 16, 1993

[54] EXTENDABLE FIFO

[75] Inventor: Rong-Yean Lee, Hsinchu, Taiwan

[73] Assignee: Industrial Technology Research Institute, Taiwan, Taiwan

[21] Appl. No.: 797,211

[22] Filed: Nov. 25, 1991

[51] Int. Cl.$^5$ .................................................. G11C 7/00
[52] U.S. Cl. ................................. 365/221; 365/189.04; 365/233
[58] Field of Search .................... 365/221, 233, 189.04

[56] References Cited

U.S. PATENT DOCUMENTS

| | | | |
|---|---|---|---|
| 4,592,019 | 5/1986 | Huang et al. | 365/78 |
| 4,839,866 | 6/1989 | Ward et al. | 365/221 |
| 4,888,739 | 12/1989 | Frederick et al. | 365/221 |
| 5,005,158 | 4/1991 | McClure et al. | 365/221 X |
| 5,157,633 | 10/1992 | Aoki | 365/221 |

*Primary Examiner*—Eugene R. LaRoche
*Assistant Examiner*—Do Hyun Yoo
*Attorney, Agent, or Firm*—Meltzer, Lippe, Goldstein, Wolf, Schlissel & Sazer

[57] ABSTRACT

An extendable FIFO is disclosed. The FIFO utilizes a quasi-simultaneous clock detector for detecting the activation of READ and WRITE signals and for generating first and second delayed signals in response thereto and a MASK signal when the READ and WRITE signals are substantially simultaneously activated. Additionally, the FIFO includes a plurality of pointer circuits for receiving the first and second delayed signals and the MASK signal and for generating a plurality of clocks and load signals in response thereto. The FIFO further includes a matrix of flip-flops organized into columns which are sequentially connected for receiving the clocks and load signals which control which data column is written into and the sequential transfer of data between columns.

5 Claims, 7 Drawing Sheets

TRUTH TABLE

| OPER. | LF1 | UF1 | P1 | L1 | LF2 | UF2 | P2 | L2 | LF3 | UF3 | P3 | L3 | WD | M | C1 | C2 | C3 | O |
|---|---|---|---|---|---|---|---|---|---|---|---|---|---|---|---|---|---|---|
| INIT. | 1 | 0 | 1 | 1 | 0 | 0 | 0 | 0 | 0 | 0 | 0 | 0 | 0 | 1 | | | | |
| WRITE | 0 | 0 | 0 | 0 | 0 | 1 | 1 | 1 | 0 | 0 | 0 | 0 | 0 | 1 | D1 | | | |
| WRITE | 0 | 0 | 0 | 0 | 0 | 0 | 0 | 0 | 0 | 1 | 1 | 1 | 1 | 1 | D1 | D2 | | |
| WRITE | 0 | 0 | 0 | 0 | 0 | 0 | 0 | 0 | 1 | 0 | 0 | 0 | 0 | 1 | D1 | D2 | D3 | D1 |
| READ | 0 | 0 | 0 | 0 | 0 | 0 | 0 | 0 | 0 | 1 | 1 | 1 | 1 | 1 | D2 | D3 | | |
| WRITE | 0 | 0 | 0 | 0 | 0 | 1 | 1 | 1 | 1 | 0 | 0 | 0 | 0 | 1 | D2 | D3 | D4 | D2 |
| READ | 0 | 0 | 0 | 0 | 1 | 0 | 0 | 0 | 0 | 1 | 1 | 1 | 0 | 1 | D3 | D4 | | D3 |
| READ | 0 | 0 | 0 | 0 | 0 | 0 | 1 | 1 | 0 | 0 | 0 | 0 | 0 | 1 | D4 | | | D4 |
| READ | 1 | 0 | 1 | 1 | 0 | 0 | 0 | 0 | 0 | 0 | 0 | 0 | 0 | 1 | | | | |
| INIT. | 0 | 0 | 0 | 0 | 0 | 0 | 0 | 0 | 0 | 0 | 0 | 0 | 1 | 1 | D1 | D2 | D3 | D1 |
| R/W | 0 | 0 | 0 | 0 | 0 | 0 | 0 | 0 | 0 | 0 | 1 | 1 | 1 | 0 | D2 | D3 | D4 | D1 |
| INIT. | 0 | 0 | 0 | 0 | 0 | 0 | 0 | 0 | 0 | 1 | 1 | 1 | 0 | 1 | D1 | D2 | | |
| R/W | 0 | 0 | 0 | 0 | 0 | 0 | 0 | 1 | 1 | 1 | 1 | 1 | 0 | 0 | D2 | D3 | D1 | D1 |

EXTENDABLE FIFO

FIELD OF THE INVENTION

The present invention relates to an extendable first-in, first-out (FIFO) device, and in particular to a FIFO whose storage capacity can be extended in a manner requiring a minimum effort in the IC layout phase.

BACKGROUND OF THE INVENTION

A FIFO is a memory unit that temporarily stores information so that when the data is retrieved the data first stored in the FIFO is the first data retrieved from the FIFO. The successive retrievals, therefore, output the stored data in the order in which they were inputted.

In many kinds of integrated circuits, particularly in those related to communications, there is a constant need to use FIFOs. In most cases, a FIFO is utilized to perform a buffering function. For example, in an integrated circuit, a FIFO can be used to buffer data that is being transmitted between two different circuit units controlled by two asynchronous clocking signals.

Similarly, if an integrated circuit is interfaced with an external microcomputer, data can be stored in a FIFO until there is a sufficient accumulation of data to start a continuous transmission of data between the integrated circuit and the microcomputer. Advantageously, this reduces the need for the microcomputer to execute an interrupt process in receiving data from the integrated circuit.

A conventional FIFO contains a data storage unit for storing a certain amount of data. Data is written into or is read out of the FIFO under the control of clock signals. When the FIFO is full and no more data can be written into it, a FULL Signal is generated. Similarly, when all of the data stored in the FIFO is read out, an EMPTY signal is generated.

To that end, the internal design of a conventional FIFO ordinarily comprises a plurality of regularly arranged memory units and a control unit which controls the writing of data into and the reading of data out of the memory units in response to the heretofore mentioned clock signals. The control unit also generates the FULL and EMPTY signals when the memory units are all FULL or all EMPTY.

When a FIFO is incorporated into an integrated circuit, the design of a central control unit is often a major undertaking. In particular, a separate design of the central control unit must usually be made for each FIFO of different size (i.e. different data storage capacity). In addition, because the centralized control unit is not modular, extra layout effort is required for an integrated circuit implementation.

One possible approach to this problem is modularization (see, e.g., Ward et al, U.S. Pat. No. 4,839,866 and Huang et al, U.S. Pat. No. 4,592,019). In particular, it would be highly advantageous if a FIFO comprising an expandable memory matrix section and control section could be devised so that a FIFO of arbitrary size could be produced simply by connecting the appropriate number of circuits. It is an object of the present invention to provide such a FIFO design. It is a further object of the invention to provide a simple and efficient control section that is especially easy to implement in an integrated circuit.

SUMMARY OF THE INVENTION

In accordance with an illustrative embodiment of the invention, a FIFO comprises a matrix of flip-flops arranged into columns for storing data. The control of the FIFO is achieved using pointer circuits in conjunction with a quasi-simultaneous clock detector (QSCD). The QSCD receives the FIFO read and write signals and generates delayed signals in response thereto. These delayed signals are received by the pointer circuits which control the sequential storage and retrieval of data from the FIFO in a first-in first-out manner. If the read and write signals are activated substantially simultaneously, the quasi-simultaneous clock detector generates a mask signal which allows the FIFO to both output the appropriate data and store the next data correctly.

The flip-flop matrix may be comprised of any number columns of flip-flops, each column containing a number of flip-flops equal to the data word size. Associated with each column is a pointer circuit which stores a pointer value (PTR) and is capable of generating a load (LOAD) and clock signal (CK) for each column. The PTR signal indicates the next available empty space in the FIFO while the CK enables the flip-flop column to store data. The LOAD signal is used to select the input of each column. For example, if the LOAD signal is a "1", data is read from a data input (DATA IN) line and stored in that particular column. If the load signal is "0" the data is transferred in from the next succeeding column. In this manner, data propagates from column to column sequentially towards an end where data may be output from the FIFO. Illustratively, output from the most precedent column may be from the left column, with data being written into succeeding columns to the right. When a read occurs, the data in the leftmost column is output and the remaining data shifts one column from the right to the left.

In the operation of this embodiment, as write signals are received, data is written from the DATA IN line to the next available column as indicated by the PTR signal. No other data transfer occurs. Meanwhile, the pointer circuit associated with the next available column sets its PTR and the first PTR is cleared. In this fashion, data may be stored sequentially in succeeding columns away from the output end of the FIFO.

In contrast, during a read operation, all of the pointer circuits activate their flip-flop CK signals enabling data storage. Since all of the PTR signals (except the PTR signal associated with the next available empty column) are 0, data is transferred from each column to its immediate predecessor. As mentioned before, data propagates towards the output end during a read operation. In a complementary fashion to the above, the current PTR signal is reset to "0" and the PTR of its immediately preceding column is set to "1". This step updates the FIFO to reflect the removal of one datum from the FIFO. The data of the most precedent column is transferred to the FIFO output.

In short, an expandable FIFO is disclosed which uses a matrix of flip-flops and pointer circuits for each FIFO cell. The modular nature of both the pointer circuits and the flip-flop data storage matrix allow for the construction of a FIFO of arbitrary size by connecting a desired number of flip-flops and pointer circuits.

DETAILED DESCRIPTION OF THE PREFERRED EMBODIMENT

Figure 1:
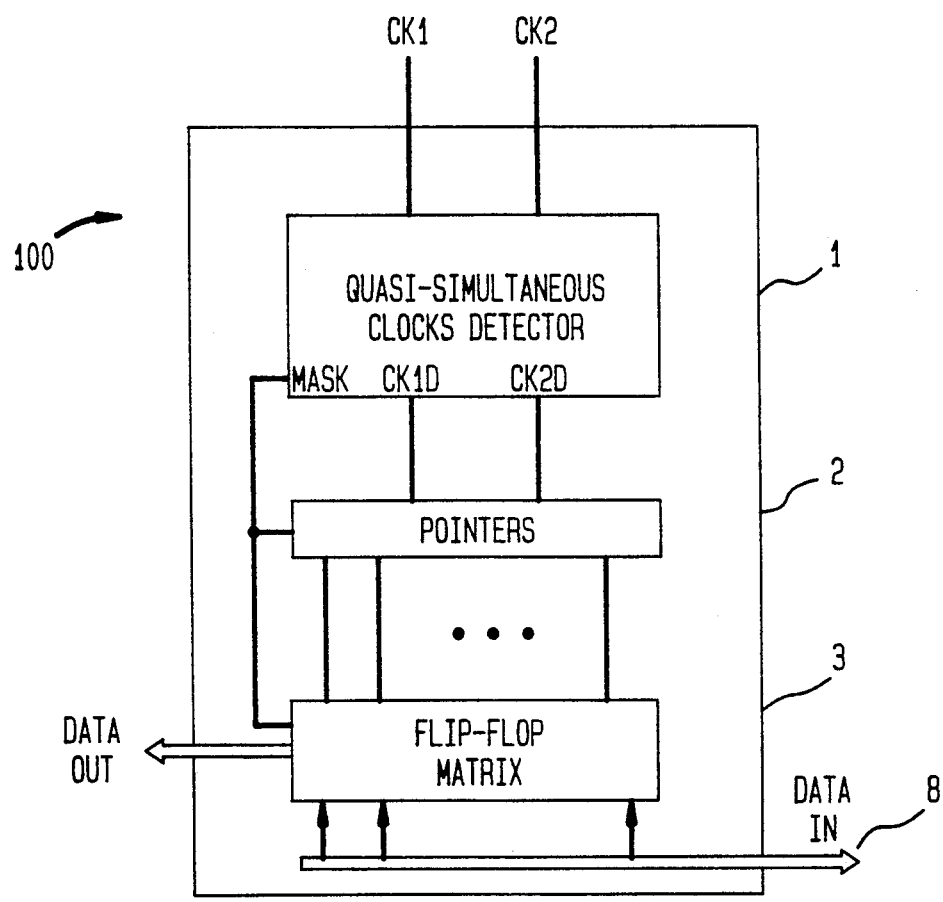
FIG. 1 and FIG. 2 are block diagrams illustrating an extendable FIFO in accordance with the present invention.
Figure 2:
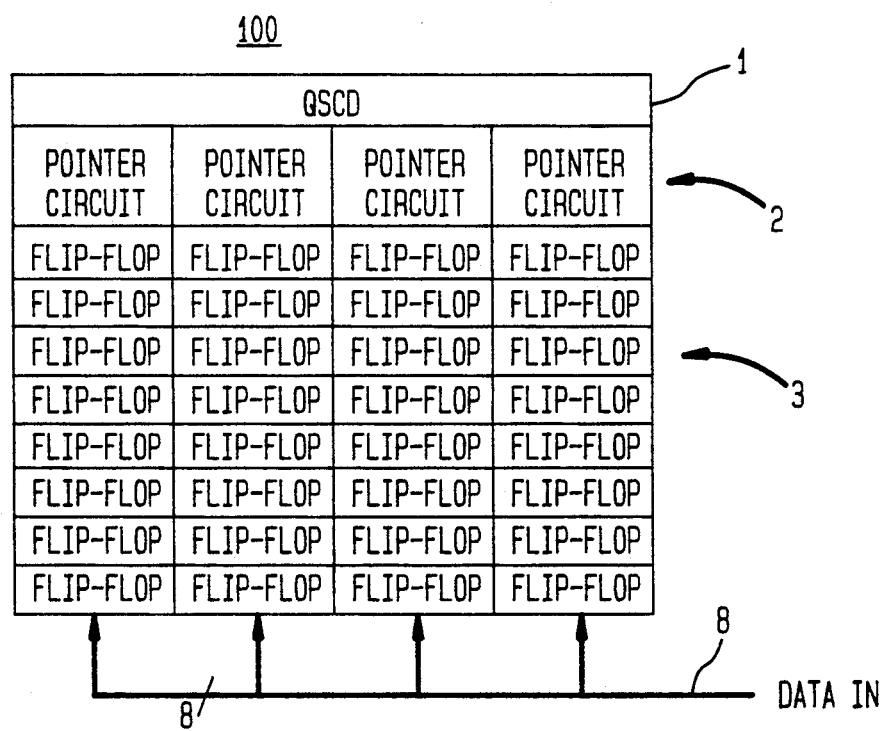

With reference to FIG. 1 in conjunction with FIG. 2, there is shown a block diagram for an extendable FIFO 100 according to the present invention. As can be seen, the extendable FIFO 100 comprises a QSCD 1, a row of pointer circuits 2 and a flip-flop matrix 3. With an 8×4 FIFO as an example, there will be a QSCD and four pointer circuits constituting the row of pointers 2. There is also an 8-rows×4 columns array of flip-flops (totalling 32 flip-flops) constituting the flip-flop matrix 3. A data-in bus 8 is provided for sending, for example, eight-bit data corresponding to the number of flip-flops in each column of the flip-flop matrix 3, during a write operation while eight-bit data is sent out from the leftmost column of the flip-flop matrix during a read operation.

Figure 3:
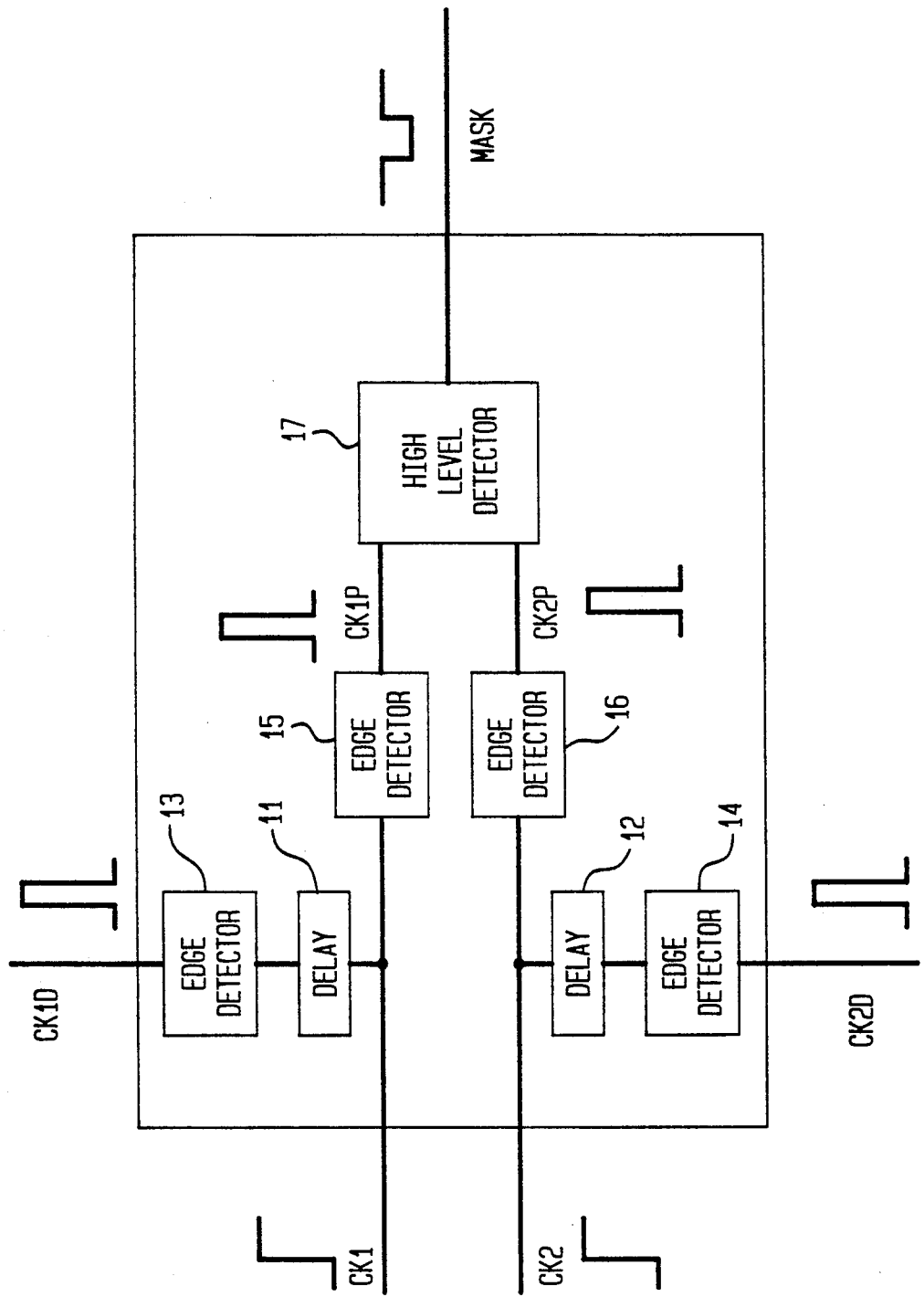
FIG. 3 is a block diagram illustrating a quasi-simultaneous clocks detector (QSCD) in accordance with the invention.

Referring to FIG. 3, a block diagram of the QSCD is illustrated. A write signal CK1 is input to a first delay 11 and a first edge detector 15 while a read signal CK2 is input to a second delay 12 and a second edge detector 16. The output of the first delay 11 is connected to the input of a third edge detector 13, and the output of the second delay 12 is attached to the input of a fourth edge detector 14.

The output of the first and second edge detectors 15 and 16 are connected to the two inputs of a high level detector 17.

Figure 4:
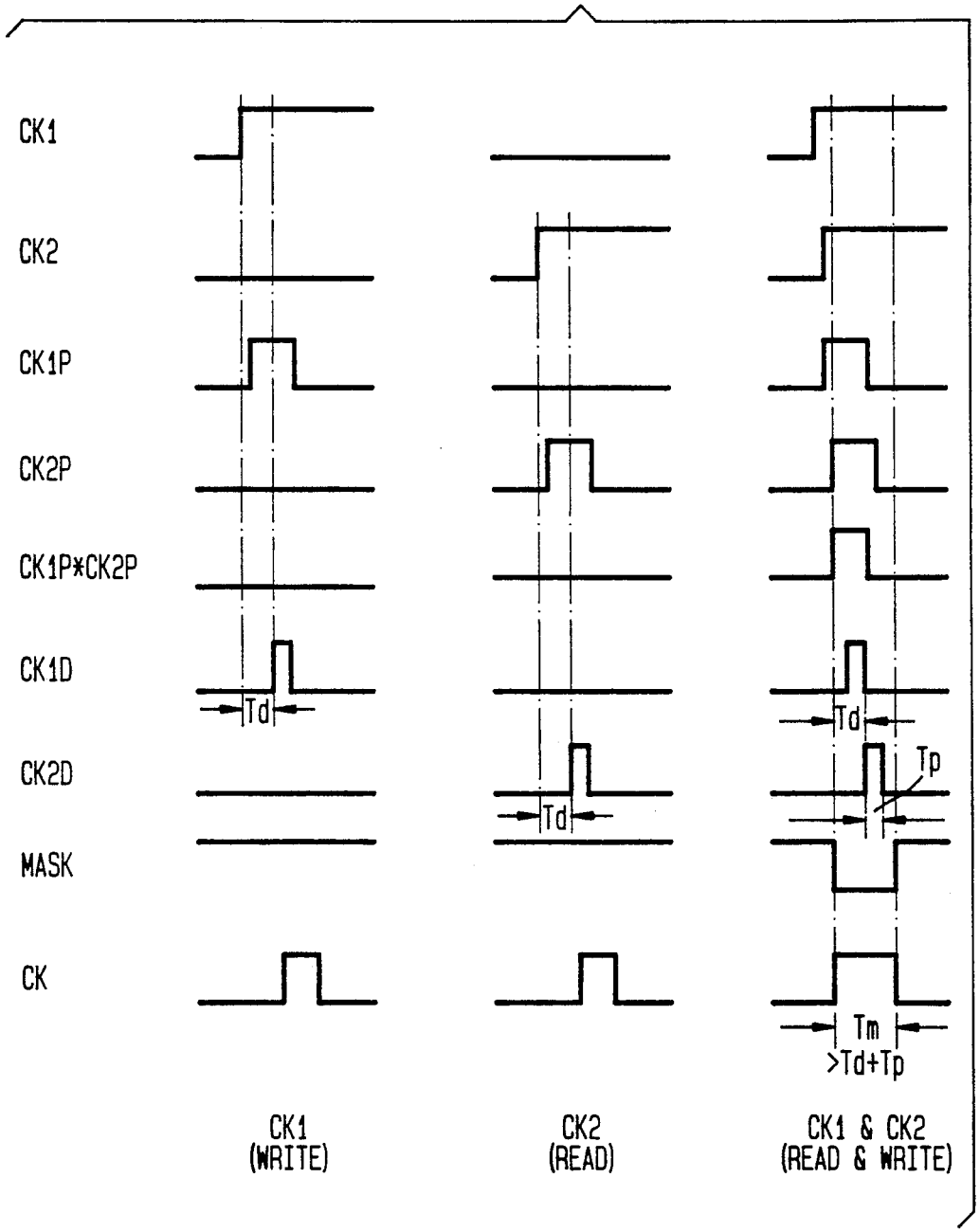
FIG. 4 is a timing diagram illustrating various timing relationships of three different combinations of activated clock signals CK1 and CK2.

The operation of the QSCD 1 will be detailed with reference to FIG. 4 in combination with FIG. 3. FIG. 4 represents the timing relationship of various signals within the QSCD 1 in three different situations. The left column of FIG. 4 represents the first situation where the WRITE signal CK1 is changed from a low state to a high state and READ signal CK2 is kept low. The first, second, third and fourth detectors 13-16 are all rising-edge detectors. Therefore, the output signal CK1P of the first edge detector 15 will generate a pulse signal upon detecting a rising edge at its input, while the output signal CK2P of the second edge detector 16 is maintained at the same state as CK2. Within the high level detector 17, the signal CK1P is ANDed with the signal CK2P resulting in a low state as shown in FIG. 4. Then, the high level detector 17 generates the MASK signal in response to the CK1P * CK2P signal (where *=AND). In this situation, the MASK is left in its normal high (i.e. logic 1) state as shown in FIG. 4. CK1D and CK2D are two signals derived respectively from outputs of the third edge detector 13 and fourth edge detector 14. Note that CK1D is delayed for a time Td with respect to CK1P.

A similar result occurs when CK2 changes from a low state to a high state (representing a read operation) as can be seen in the middle column of FIG. 4.

A third situation, depicted in the right column, occurs when the WRITE signal CK1 and the READ signal CK2 are activated substantially simultaneously. In this situation CK1P and CK2P both become a pulse respectively. The resulting CK1P * CK2P is also a pulse which is converted into a negative pulse forming the MASK signal with a width Tm. The CK1D and CK2D signal both have a width Tp and are delayed by a time Td with respect to CK1P and CK2P respectively.

Figure 5:
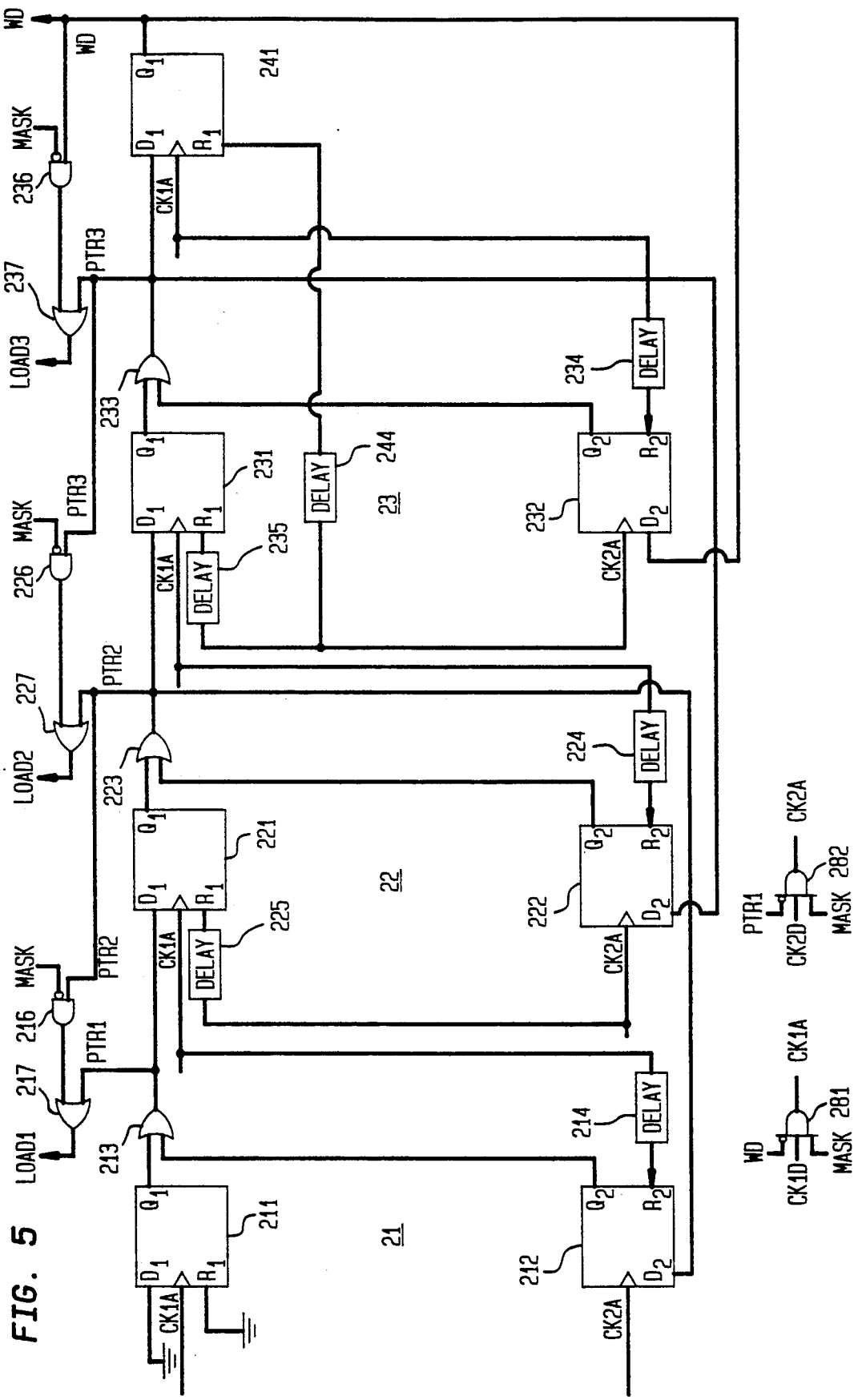
FIG. 5 is a detailed logic diagram illustrating the construction and interconnection of some of the pointer circuits of FIG. 1.

FIG. 5 shows a detailed logic diagram of the pointer circuits 2, where only three pointers 21, 22 and 23 are illustrated for explanation. The first pointer circuit 21 contains an upper D-type flip-flop 211 and a lower D-type flip-flop 212 with their clock inputs being respectively connected to CK1A and CK2A. CK1A is derived by ANDing CK1D, MASK, and the inverted Q1 output $\overline{WD}$ of flip-flop 241 using AND gate 281. CK2A is derived by ANDing CK2D, MASK, and the inverted most-left-side PTR signal using AND gate 282. Actually, the output of flip-flop 241, WD, is the same as the "FIFO FULL" signal and the most-left-side PTR is the same as the "FIFO EMPTY" signal. The outputs Q1 and Q2 of the upper and lower flip-flops 211 and 212 of the first pointer circuit 21 are attached to an OR gate 213 which outputs a signal referred to as PTR1. The signal CK1A also goes to the reset terminal R2 of the lower flip-flop 212 through a delay element 214. The second pointer circuit 22 also comprises an upper D-type flip-flop 221 and a lower D-type flip-flop 222 with their outputs Q1 and Q2 coupled to an OR gate 223 whose output forms a signal PTR2. CK1A and CK2A also respectively are connected to the clock inputs of the upper and lower flip-flops 221 and 222. However, CK2A connects to the reset terminal of the upper flip-flop 221 through a delay element 225. For the boundary conditions, the D1 and R1 signals of the most-left-side upper D-type flip-flop 211 are pulled low to disable them. Additionally, a flip-flop 241 is provided for storing the FIFO write disable signal $\overline{WD}$. While the WD flip-flop 241 has no corresponding column in matrix 3, its operation, in most respects, is similar to that of the other upper flip-flops 211, 221 and 231 of pointer circuits 21, 22 and 23.

The derivation of the LOAD signals is now detailed. As shown, the MASK signal coming from the QSCD 1 is inverted and then input to an AND gate 216 together with the signal PTR2 from the preceding pointer circuit 22. Thereafter, the output of the AND gate 216 is OR'ed with PTR1 by OR gate 217. The output of the OR gate 217 represents the LOAD1 signal of the pointer 21. Likewise, the LOAD2 signal of the pointer 22 may be generated using the MASK signal, the PTR3 signal and the PTR2 signal. In the case of a last pointer, the required PTR signal from a succeeding pointer is replaced by the WD signal.

Figures 6, 8:
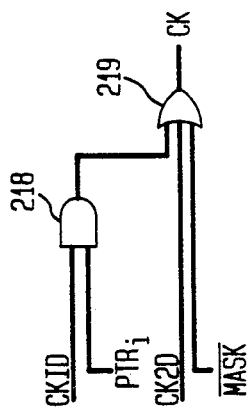
FIG. 6 is a logic diagram showing how the CK signal for each column of the matrix of flip-flops may be generated.
FIG. 8 is a table for explaining the operation inside the pointer circuits.
Figure 7:
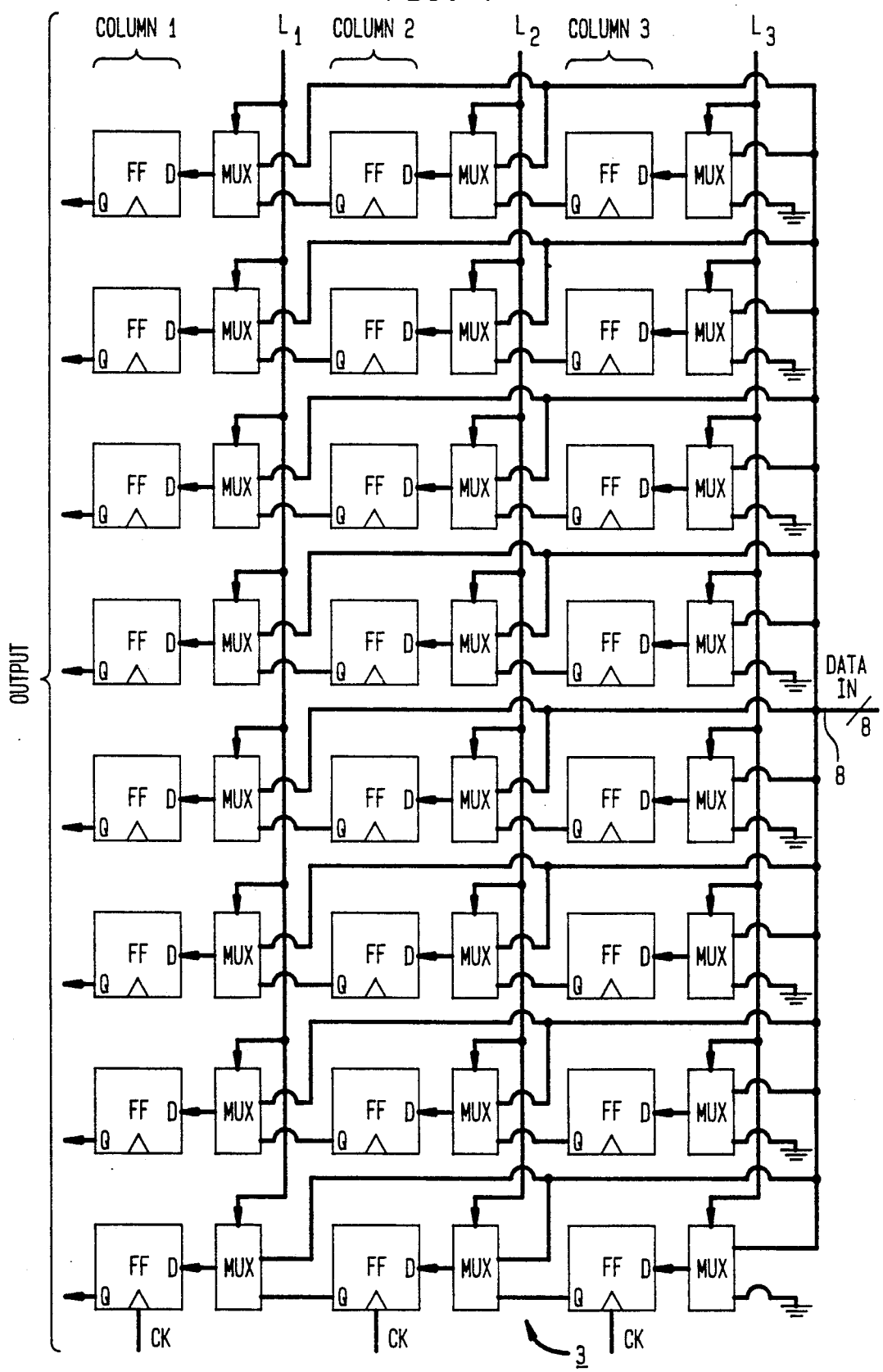
FIG. 7 is a schematic logic diagram illustrating the construction of the flip-flop matrix in FIG. 1.

FIG. 6 illustrates how the signal CK of FIG. 7 may be generated. For each pointer circuit, a CK signal must be generated to enable a specific column of the flip-flop matrix 3. First, the CK1D signal and the PTR signal of a specific pointer are input to an AND gate 218. The output of the AND gate 218 is coupled to an OR gate 219 together with the CK2D signal and the inverted MASK signal. The output of the OR gate 219 is the CK signal. One logic circuit as depicted in FIG. 6 is necessary for each column of matrix 3. Thus, CK is logic 1 for a particular pointer circuit whose MASK or CK2D is logic 1 or CK1D and the PTR of the particular pointer circuits are both logic 1.

FIG. 7 represents a schematic logic diagram for the flip-flop matrix 3 of FIGS. 1 and 2. In this illustration, the incoming data word from the DATA IN line 8 contains eight bits, so for each pointer circuit 2 there is formed a column of eight D-type flip-flops in the flip-flop matrix 3 as shown. For 3 pointer circuits there will be 3 columns of flip-flops, each of which formed of 8 flip-flops, resulting in an 8×3 flip-flop matrix. As illustrated, for each flip-flop in the flip-flop matrix 3 there is a multiplexer with its two inputs respectively connected to the Q output of a corresponding flip-flop in the immediate succeeding column (in this case, the column to the immediate right) and the DATA IN line 8. The output of each multiplexer is coupled to the D-input of the associated D-type flip-flop. Each LOAD signal coming from the individual pointer circuit is applied to the select terminal of each multiplexer in that respective column. If the LOAD signal is a "1" the data from the DATA IN line 8 is selected, whereas if the LOAD is a "0" the Q outputs from the succeeding column will be selected. The Q outputs of the leftmost column of flip-flop matrix shown in FIG. 7 transmit the data to be read out.

Now with reference to FIG. 8, which shows the bit status of the upper and lower flip-flops of the pointer circuits 2, in conjunction with FIGS. 4, 5, 6 and 7, the operation of the invention will be detailed for a specific example. In FIG. 8, flip-flops 211 and 212 are referred to, respectively, as LF1 and Uf1, 221 and 222 as, respectively, LF2 and UF2, 231 and 232 as LF3 and UF3 and 241 as WD. The MASK signal is referred to as M. The flip-flop matrix columns corresponding to pointer circuits 21, 22 and 23 are respectively referred to as C1, C2 and C3, the output of the FIFO is referred to as O, the PTR signals are referred to as P1, P2 and P3 and the load signals are referred to as L1, L2 and L3.

Initially the Q output of the lower flip-flop in the first pointer circuit (212 of FIG. 5) is set to a "1" and the outputs of all the other flip-flops (211, 221, 222, 231, 232 and 241) are cleared using ordinary techniques. At this initial state the PTR1 signal of the first pointer, which is derived by ORing Q1 and Q2 of flip-flops 211 and 212 (by OR gate 213), is a "1" and the PTR signals of the rest of the pointers are "0". The MASK signal is a "1" in this case as the read and write signals have not been simultaneously activated. The LOAD1 signal of the first pointer circuit will be a "1" while the LOAD signals of the rest are "0". (See FIGS. 4 and 5).

Suppose a WRITE operation is to be performed as depicted on line 2 of FIG. 8. A CK1D signal is activated which becomes the CK signal for column 1 of the flip-flop matrix 3 (see FIG. 6) and the data D1 will be transferred from the DATA IN line to the first column of flip-flop matrix 3 (referred to as C1 in FIG. 8) by means of the selection of the multiplexers associated therewith. Meanwhile, in the pointer circuit 21, the lower flip-flop of the first pointer 212 (Lf1) is reset by CK1A after a delay introduced by the delay element 214 and the Q1 output of the upper flip-flop 221 (Uf2) in the second pointer 22 becomes a "1" (see FIGS. 5 and 8). Therefore, the PTR2 signal of the second pointer circuit and accordingly the LOAD2 signal of the second column of the flip-flop matrix 3 each become a "1". After the write operation is performed, the state of the pointer circuits is as depicted on line 2 of FIG. 8. Only UF2 is set, the remaining pointer flip-flops are clear. As a result, PTR2 is high (as well as LOAD2) indicating that the next available empty column is C2.

A subsequent WRITE operation, at this point, will enable the data D2 to be written into the second column, C2, of the flip-flop matrix 3 (see FIG. 8, line 3). Contemporaneously, (all the D-type flip-flops are of master-slave type), the Q1 output of the upper flip-flop 221 in the second pointer circuit 22 is clocked by CK1A to become a "0" (because of the connection of the PTR1 signal, which equals "0", to the input of the upper flip-flop 221) and the Q1 of the upper flip-flop 231 of the third pointer circuit 23 will become a "1". In a fashion similar to the first WRITE described above, the PTR3 signal of the third pointer circuit 23 and the LOAD3 signal to the third column C3 of the flip-flop matrix 3 will be a "1". At this point, only the upper flip-flop 221 is set, so no other PTR or LOAD signals are "1" (see line 3 of FIG. 8).

Similarly, a further WRITE operation can be performed as depicted on line 4 of FIG. 8 causing the data D3 to be written into the third column C3 of the matrix 3. For a FIFO 100 of 4 or more columns, the Q1 output of the upper flip-flop in the fourth pointer will become a "1" rendering a "1" in the PTR4 and LOAD4 signals. This process continues until the last column is filled. Since FIGS. 5 and 8 illustrate a 3 column FIFO, after the last column is written into, the upper flip-flop, 231 (Uf3) in this case, is set to "0" as before. The output of the last pointer, in this case PTR3, is clocked into the WD flip-flop 241. A value of "1" appears at the Q1 output of the WD flip-flop 241. When WD equals "0", the signal CK1A is held at "0" (by virtue of the AND-ing of WD, CK1D and MASK at gate 281). Thus, CK1A is disabled while WD is set to "1". This is preferred to prevent overwriting the FIFO.

Turning to FIG. 8, line 5, in conjunction with FIG. 5 a READ operation on a full FIFO 1 is depicted. Since PTR1, which doubles as the FIFO EMPTY flag, is not 1, and MASK is high (a substantially simultaneous READ/WRITE has not occurred) CK2A is enabled. Since CK2D enables the CK signal for all of the columns in the matrix 3 (see FIG. 6), all of the columns will store a new value. Each column of matrix 3 without a LOAD signal equal to "1", in this case C1–C3, will all store as their input the output of the successive column (in this case, the column to the right), that is, C1, will store the data of C2, C2 the data of C3, etc. (the last column stores the value of 0 as the corresponding multiplexer input is tied low). Since no meaningful data is stored in the column for which the PTR signal is enabled, nor its successors (columns to its right) we are unconcerned as to what happens to them. The output of the most precedent (leftmost) column is shifted to the output, O, of the FIFO as indicated on line 5 of FIG. 8.

Within the pointer circuits 2, the PTR and LOAD signals must be updated to reflect the removal of one datum from the FIFO (C3 is now empty as its data has shifted to C2). To that end, when CK2A is enabled the lower flip-flop 232 of pointer circuit 23 stores a "1" by virtue of its input being connected to WD which equals "1". The WD flip-flop 24, meanwhile, is reset by CK2A, after a delay caused by delay unit 244. The results are depicted on line 5.

Referring now to line 6 of FIG. 8, should a subsequent WRITE occur, data D4 will be written to column C3 similarly as described above. The lower flip-flop 232 of pointer circuit 232 will be reset to "0" by CK1A, after a delay imposed by delay element 234. Hence, irrespective of the order of operations, a WRITE always sets the next upper flip-flop and clears the current lower and upper flip-flop while a READ always sets the previous lower flip-flop and clears the current lower and upper flip-flop.

Lines 7-9 depict the results of further READ operations. After the last datum is read from C1 as depicted on line 9 the FIFO has returned to its initial state with PTR1 and LOAD1 set to "1". With PTR1 set high, CK2A is disabled by virtue of the AND gate 282 of FIG. 5. This is desirable in the preferred embodiment to prevent under-reads of an empty FIFO 100.

Turning now to the second table of FIG. 8, the case of near simultaneous READ and WRITE signals is considered. Suppose initially the FIFO is full with data D1-D3. The MASK signal is pulled low thereby disabling the CK1D and CK2D signals by the AND gates 281 and 282 in FIG. 5 so that the flip-flop states in the pointer circuits 2 will not change. However, owing to the MASK signal now being a "0", the output of the specific AND gate (one of the AND gates 236, 226 or 216) associated with the next empty column (i.e. the gate with a PTR signal equal to "1") is a "1". As can be seen at the top of FIG. 5, the LOAD signal of a pointer circuit may be a "1" if either the column associated with it contains the last data written to the FIFO 100 or if its PTR equals a "1" (it is the next empty column). In this particular example, (refer to line 1 of table 2 in FIG. 8, note WD=1), no empty column exists, so the WD signal is set to "1". The WD signal is ANDed at gate 236 with the MASK complement which produces a "1". The output 236 is ORed at gate 237 with PTR3 (now "0") to produce a LAOD3 signal equal to "1".

The mask signal also enables the CKs of all of the columns (see FIG. 6). All of the columns whose LOAD signals equal "0" will transfer in the data in the succeeding (right) column. In this case, columns C1 and C2 will transfer in the data of columns C2 and C3 respectively and the data of column C1 will be shifted to the output. The multiplexer of column C3, however, receiving he LOAD3 signal equal to "1" will transfer in the data from the DATA IN line 8. In this manner, the FIFO properly executes a simultaneous READ and WRITE (refer to line 2 of table 2 in FIG. 8). This is desired in asynchronous systems where separate read and write instructions may occur nearly simultaneously.

In the case where the FIFO is not full, such as where columns C1 and C2, but not C3, have data (refer to line 1 of table 3 in FIG. 8), the operation is similar. Here, PTR3 equals a "1" by virtue of either the upper or lower flip-flop 231 or 232 set to 1. By virtue of PTR3 being "1", MASK being "0", and AND gate 226 and OR gate 227, LOAD2 will also be "1". Hence, in this situation both of the LOAD signals to the second and third column of the matrix 3 are "1". Thus, the written-to-be data will be written into both the second and third columns of the flip-flop matrix 3 (refer to line 2 of table 3 in FIG. 8). However, the meaningfully last data stored in the FIFO now is in the second column of the matrix and the next WRITE operation will write data into the third column of the same. Thus, the undesired data D3 of column C3 will be overwritten on the next write or ignored by successive reads because the PTR signal has not been advanced to the next pointer circuit. Column C3 can for all effective purposes be considered empty.

Note that in order for the MASK signal to mask CK1D and CK2D signals effectively during the situation when the READ and WRITE signals are activated simultaneously, the following equation must be satisfied:

$$Tp < Td$$

$$Tm > Tp + Td$$

where Td is the delay time of CK1D and CK2D signals with respect to the activation time of CK1 and CK2 respectively. Tp is the width of the pulse CK1D or CK2D and Tm is the width of the signal MASK in terms of time.

It should be fully appreciated that the storage capacity of FIFO according to the present invention can be readily expanded by regularly increasing the number of pointer circuits and flip-flops. This would be a great advantage in the IC layout phase and in automatic layout generation.

Finally, the above-described embodiments of the invention are intended to be illustrative only. Numerous alternative embodiments may be devised by those skilled in the art without departing from the spirit and scope of the following claims.

I claim:

1. An extendible FIFO comprising:
a quasi-simultaneous clock detector for detecting the activation of read and write signals and generating first and second delayed signals in response thereto and a mask signal when said read and write signals are substantially simultaneously activated;
a plurality of pointer circuits for receiving said first and second delayed signals and said mask signal and for generating particular clocks and load signals for performing a read operation in response to said first delayed signal, a write operation in response to said second delayed signal, or simultaneous read and write operations in response to said mask signal, depending on which of said first and second delayed signals and said mask signal are received by said pointer circuits; and
a matrix of flip-flops organized into columns which are sequentially connected for receiving said clocks and load signals for controlling into which column data is to be written and for controlling the sequential transfer of data between columns.

2. An extendible FIFO comprising:
a quasi-simultaneous clock detector for detecting the activation of read and write signals and generating first and second delayed signals in response thereto and a mask signal when said read and write signals are substantially simultaneously activated;
a plurality of pointer circuits for receiving said first and second delayed signals and said mask signal and for generating a plurality of clocks and load signals in response thereto; and
a matrix of flip-flops organized into columns which are sequentially connected for receiving said clocks and load signals for controlling into which column data is to be written and for controlling the sequential transfer of data between columns,
said FIFO further comprising:

a data-in line connected to said flip-flop matrix; and a plurality of multiplexers responsive to said load signals, each of said multiplexers having an output connected to one flip-flop column, a first input connected to a neighboring flip-flop column and a second input connected to said data-in line so that when said write signal is activated said pointer circuit associated with an empty flip-flop column closest to one end of the matrix generates a clock and load signal to write data from the data-in line therein and when said read signal is activated all of the pointer circuits generate a clock and load signal to transfer data from each corresponding flip-flop column into the adjacent column nearer to said one end, the flip-flop column closes to the one end outputting the data stored therein, so that data shifts one column towards said one end of said flip-flop matrix.

3. The FIFO of claim 2 wherein the pointer circuits, in response to the activation of said mask signal, generate clock and load signals to substantially simultaneously shift by one column data stored in said columns towards said one end of said flip-flop matrix, the data stored in the column closest to said one end being output, and transferring data on said data-in line into the flip-flop column which stored the last data written to the FIFO prior to the activation of the mask signal.

4. An extendible FIFO comprising:

a quasi-simultaneous clock detector for detecting the activation of read and write signals and generating first and second delayed signals in response thereto and a mask signal when said read and write signals are substantially simultaneously activated;

a plurality of pointer circuits for receiving said first and second delayed signals and said mask signal and for generating a plurality of clocks and load signals in response thereto; and a matrix of flip-flops organized into columns which are sequentially connected for receiving said clocks and load signals for controlling into which column data is to be written and for controlling the sequential transfer of data between columns, wherein said quasi-simultaneous clock detector comprises:

a high-level detector connected to said pointer circuits for receiving said read and write signals and for generating said mask signal when said read and write signals are activated substantially simultaneously;

a first delay circuit for generating said first delayed signal in response to the write signal; and a second delay circuit for generating said second delayed signal in response to the read signal.

5. The FIFO of claim 4 wherein the width of said mask signal pulse, the widths of said first and second delayed signal pulses and a delay period generated by said first and second delay circuits satisfy:

$$T_p < T_d$$

$$T_m > T_d + T_p$$

where $T_d$ is the delay period generated by the first and second delay circuits, $T_p$ is the width of the first and second delay signal pulses and $T_m$ is the width of the mask signal pulse.

* * * * *